United States Patent [19]

Czerwinski et al.

[11] Patent Number: 4,578,867
[45] Date of Patent: Apr. 1, 1986

[54] SPRING COILABLE TOP READING RULE WITH IMPROVED GUIDE STRUCTURE FOR COILABLE BLADE

[75] Inventors: Frank G. Czerwinski, East Berlin; Edward C. Rutty, Portland, both of Conn.

[73] Assignee: The Stanley Works, New Britain, Conn.

[21] Appl. No.: 691,224

[22] Filed: Jan. 14, 1985

[51] Int. Cl.⁴ .............................................. G01B 3/10
[52] U.S. Cl. .................................... 33/138; 242/84.8; 242/107.3
[58] Field of Search ......................... 33/138, 139, 140; 242/84.8, 107, 107.3, 107.2

[56] References Cited

U.S. PATENT DOCUMENTS 2,207,277  7/1940  Volz.
3,255,531  6/1966  Anderson.
3,281,943  11/1966 Maksim, Jr.
3,493,190  2/1970  Quenot.
3,494,038  2/1970  Quenot.
3,731,389  5/1973  King.

FOREIGN PATENT DOCUMENTS 1305855  4/1962  France .................................. 33/138
 991888  5/1965  United Kingdom .................. 33/138

Primary Examiner—William D. Martin, Jr.

[57] ABSTRACT

A top reading power return rule has a shock-absorbing rib adjacent the spool, to prevent kinking upon retraction of the blade. The rib is positioned so as to be normally out of contact with the blade, but to intercept the blade when engagement of the hook member upon the casing causes it to abruptly stop and snap inwardly. The rib functions by decreasing the deflection of the taut blade about the small roller closest to the spool; excessive deflection is also avoided by providing a contact surface portion on the rib that is of relatively large area.

5 Claims, 3 Drawing Figures

U.S. Patent   Apr. 1, 1986   4,578,867
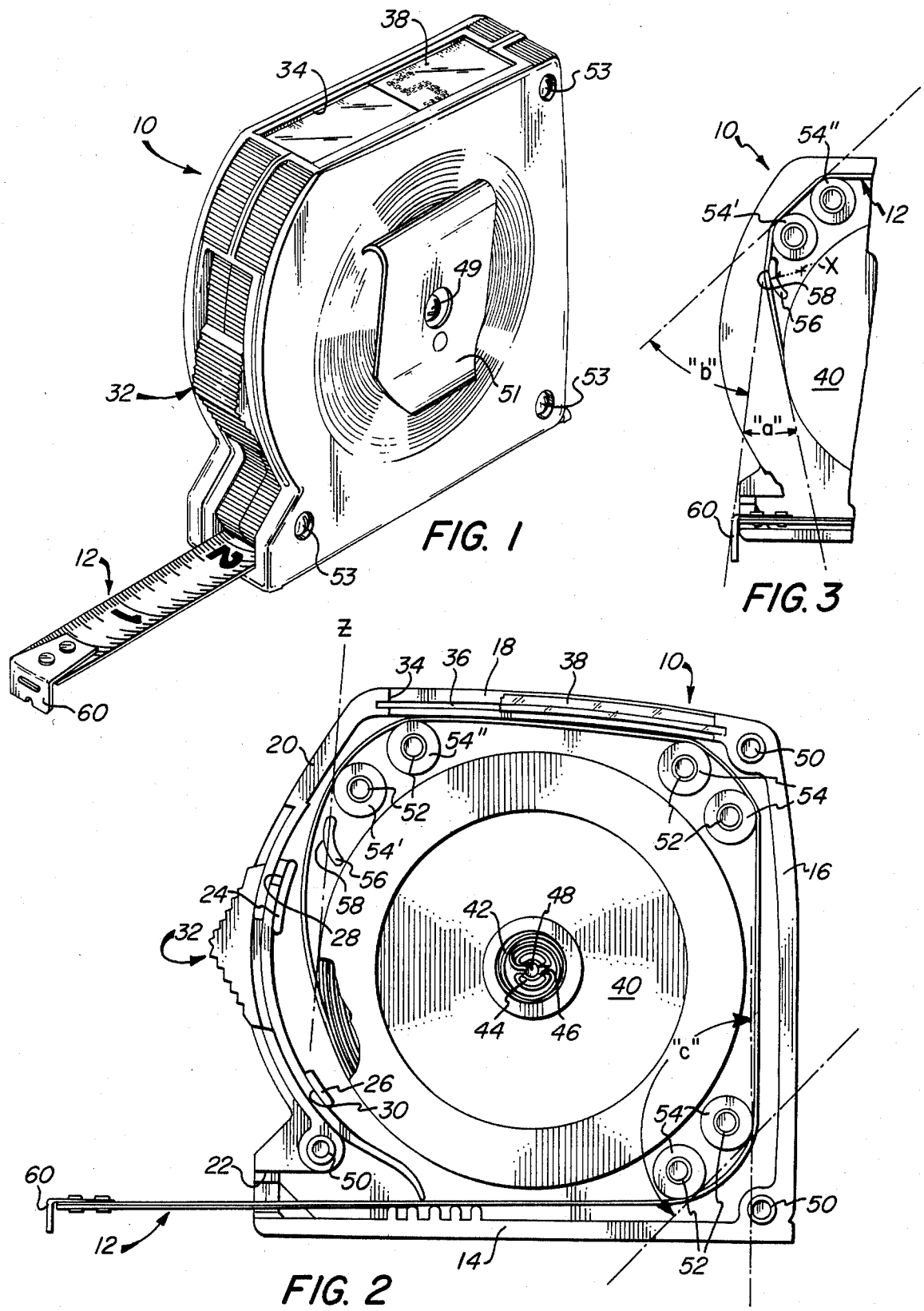

SPRING COILABLE TOP READING RULE WITH IMPROVED GUIDE STRUCTURE FOR COILABLE BLADE

BACKGROUND OF THE INVENTION

Top reading rules are gaining considerable acceptance because of the ease and convenience with which they permit inside dimensions to be measured. It is of considerable importance, in such a rule, that the measuring blade be disposed in a substantially rectilinear condition when passing beneath the window provided in the top wall, so that readings taken will be accurate. This in turn imposes certain constraints upon the internal system by which the blade is guided, since it means that relatively severe directional changes must occur at the points of transition to and from the section of the path that traverses the window.

Additional factors must also be taken into account in designing the blade guiding and supporting system. It is of course of utmost importance that the components of the system minimize the amount of friction created, to avoid undue blade wear and to ensure smooth and trouble-free operation of the rule. This has been achieved by utilizing small guide rollers supported within the casing at transition points along the path of blade movement, which will generally be fabricated from a synthetic resinous material having a low coefficient of friction; coatings of solid lubricants on blade surfaces have also been used to facilitate movement.

Another consideration is the external size of the rule casing. Not only is it desirable, from the standpoint of manufacturing and shipping expense, to make the rule as compact as possible (consistent with practicablity and convenience of handling) but indeed, it has been found that the consumer has developed an unconscious expectation concerning the "feel" of the instrument; as a result, even a slight enlargement of the size of the casing has met with a degree of consumer resistance.

Although top reading rules (as well as other coiled measuring rules) may be designed so that the blade is manually withdrawn and returned to the spool, in many instances a power-return feature will be preferable. However, the blade and internal components of such rules are subjected to substantial levels of shock, due to impact of the hook member upon the casing when the blade has been fully retracted. Not only does this require that the parts of the unit be so constructed as to withstand the forces involved, but it has now also been appreciated that there is a tendency for kinking of the blade to occur when movement of the blade under the force of the power spring is abruptly arrested; this is especially so in the top reading rules, due to the sharp directional changes that the blade must make in order to pass rectilinearly under the window.

It has been determined that the tendency for such kinking to occur is due to a number of factors. One is of course the force that is imparted to the blade by the power spring, since that will in turn determine the inertia of the blade and the energy that must be dissipated upon impact. The construction of the blade itself will also be a major determinant; if it is relatively wide and/or made of a material having a high yield point (i.e., tending to resist a permanent set upon distortion), the likelihood of kinking will be reduced commensurately. A third primary factor concerns the severity of deflection to which the blade will be subjected when taut. This is most important at the point along the path of movement closest to the spool, since the segment of the blade in that region will have the highest energy level when movement is arrested.

It is known that the transversely curved metal blades used in measuring rules of this sort exhibit a so-called "natural curvature" when deflected longitudinally upon themselves, the radius of which curvature is substantially independent of the degree of deflection; this characteristic is described, for example, in Quenot U.S. Pat. No. 3,494,038. As long as the blade is subjected to no deflection sharper than the radius of natural curvature, it is evident that kinking will not occur. Hence, any such tendency could be eliminated in a measuring rule by utilizing guide rollers of sufficient radius.

As mentioned above, however, space limitations prohibit the use of overly large rollers, and this is particularly true when other elements must be accommodated within the casing, such as the slide-type locking members which are widely employed to maintain extended rule positions. Similarily, the use of a series of relatively small rollers, arranged to constrain the blade to a path which simulates the natural curvature (as is also disclosed in the Quenot patent), is not practical because of the deviations from conventional casing size and design that it requires, and because the added rollers produce excessive levels of friction.

In addition to the Quenot patent mentioned above, the following United States patents may be of interest to the instant subject matter:

Volz U.S. Pat. No. 2,207,277 shows the use of ribs which function as guide surfaces in a coilable measuring device. Anderson U.S. Pat. No. 3,255,531 discloses a top-reading measuring rule wherein ball bearings, which may be seated in arcuate plates, define means for guiding the tape through the housing. A top-reading tape measure is shown in Maksim Jr. U.S. Pat. No. 3,281,943, which uses a straight post member to facilitate measuring irregularly shaped objects.

Quenot U.S. Pat. No. 3,493,190 shows multiple guide elements for the blade of a top reading, power return rule. The rollers cooperate with a rib to guide the tape along a constant "trajectory"; two continuous ribs on either side of the tape, and various other combinations of elements, can be substituted. Finally, the power-return, top-reading tape measuring devices disclosed in King U.S. Pat. No. 3,731,389 has an integral marker and uses curved plates to guide the tape.

Accordingly, it is the broad object of the present invention to provide a novel top reading power return rule in which the possibility of blade kinking, upon abrupt arrestment of retraction, is substantially eliminated.

It is a more specific object of the invention to provide such a rule in which kinking is avoided without increasing the size of the casing or the amount of friction on the blade.

An additional object of the invention is to provide such a rule wherein the foregoing features and advantages are achieved without significant increase in the cost of complexity of manufacture.

SUMMARY OF THE DISCLOSURE

It has now been found that the foregoing and related objects of the invention are readily attained in a top reading power return rule in which a transverse shock-absorbing rib is provided to absorb a proportion of the retraction energy resolved by impact of the blade hook member upon the casing. The casing employed provides an enclosure, cooperatively defined by opposed sidewalls, a top wall, a bottom wall, a front wall and a rear wall; it has a window in its top wall and a blade aperture adjacent the base of its front wall. A spool is mounted within the casing enclosure for rotation about a transverse axis between the sidewalls, and a power return spring is operatively connected to the casing for rotation of the spool. The blade of the rule is coiled on the spool for extension from and retraction into the casing, and it has an outer end extending from the aperture and terminating in a member which is dimensioned and configured to engage the casing and thereby prevent full retraction of the blade thereinto. An inner end of the blade is attached to the return spring for winding on the spool, and an intermediate portion thereof is disposed along a path within the enclosure. The path consists of a rearwardly extending leg along the bottom wall of the casing, an upwardly extending leg along the rear wall thereof, a forwardly extending, substantially rectilinear leg along the top wall and under the window of the casing, and a downwardly extending leg along the front wall to the spool.

The construction of the blade is such as to cause it to tend toward a natural curvature of determinate radius, when the blade is deflected longitudinally upon itself. A plurality of rollers are disposed on the casing about the spool adjacent to the transitions between the several legs of the path, for supporting and guiding the intermediate portion of the blade therealong within the enclosure. At least the one of the rollers that is positioned to effect transition of the blade from the forwardly extending leg to the downwardly extending leg of the path, and that lies closest to the spool therealong, has a radius substantially smaller than the determinate radius. Due to the natural curvature of the blade, and the relative positions of the rollers and the spool, the blade is caused to assume a convexly arched configuration in its normal movement between the "one" roller and the spool, outwardly from an imaginary rectilinear line of tangency extending therebetween.

The shock-absorbing rib is positioned between the "one" roller and the spool, and within the area circumscribed by the blade, in its convexly arched configuration, and the imaginary rectilinear line. Normally, the rib lies out of contact with the blade, but it is spaced from the rectilinear line a distance sufficient to cause the blade, when tensioned toward the line, to contact the rib and thereby transfer to it a substantial proportion of the retraction energy, such as may be resolved upon impact of the casing-engaging member. For that purpose, the surface of the rib facing the blade is provided with a curved portion of substantial area and having a radius approximating that of the natural blade curvature, and the surface is free of portions that would produce a substantially greater (i.e., sharper) curvature in the taut blade. Thus, the rib serves to reduce the proportion of energy transferred to the "one" roller and to decrease the curvature of the blade thereabout. This in turn greatly reduces the likelihood of kinking about that roller when retraction of the blade, under the force of the spring, is abruptly arrested.

In the preferred embodiments, the determinate radius of natural curvature of the blade will have a value of about 0.6 inch, the curved contact surface portion of the rib will have a radius of about 0.4 inch, and the "one" roller will have a radius less than about 0.2 inch. The position of the rib and the radius of curvature of its contact surface portion will desirably cause the taut blade to deflect thereabout with an included angle of about 145° to 170° between the lead-on and pay-off segments; most desirably, the deflection angle will be about 160° to 165°.

Generally, the rule will include a second and a third guide roller, each having a radius substantially smaller than that of the curved surface portion of the rib. The third roller will be positioned to effect transition of the blade from the upwardly extending leg to the forwardly extending leg of its path, with the second roller positioned between the first and third and cooperating with the first roller to effect transition of the blade from its forwardly extending leg to its downwardly extending leg. The first and second rollers will be so positioned that the blade will have lead-on and pay-off sections, to and from both of them when tensioned thereabout, with an included angle of about 135° to 145° therebetween. Normally, the rule will additionally include a member for locking the blade in extended positions, the casing being provided with internal structure along its front wall for slidably seating the locking member.

BRIEF DESCRIPTION OF THE DRAWING

FIG. 1 is a perspective view of a measuring tape rule embodying the present invention, with the blade thereof slightly extended from the casing;

FIG. 2 is a side elevational view of the rule of FIG. 1, drawn to an enlarged scale and with the nearer of the two casing halves removed to show internal features; and FIG. 3 is a fragmentary diagrammatical view of the rule of the foregoing Figures, showing the measuring blade tensioned about the internal components with the hook member abutted against the casing.

DETAILED DESCRIPTION OF THE ILLUSTRATED EMBODIMENT

Turning now in detail to the drawing, therein illustrated is a measuring tape rule embodying the present invention. The rule is shown intact in FIG. 1, and with the nearer side of the casing removed in the other two Figures, the remaining casing half being generally designated by the numeral 10. Except for minor differences (which are not material to the present invention) the casing halves are substantially mirror images of one another, and cooperate to define an enclosure within which the transversely curved metal rule blade, generally designated by the numeral 12, is stored. As can be seen, the casing half 10 comprises a bottom wall element 14, a rear wall element 16, a top wall element 18, and a front wall element 20, with an aperture 22 being formed at the base of the front wall element 20 to permit passage of the blade 12. A pair of laterally extending curved flange elements 24, 26 define short channels 28, 30 within which is slidably seated a manual locking member generally designated by the numeral 32; operation of the lock to engage and maintain the blade in its extended positions is conventional, and will be evident without further description. A rectangular opening 34 is defined within the top wall element 18, and has a peripheral portion 36 within which is retained the transparent windowpane 38.

The rule includes a standard reel assembly consisting of a spool, generally designated by the numeral 40 and journaled on casing hub elements, on which the blade 12 is coiled, and a power spring 42, which is attached to the inner end portion of the blade to drive the spool 40 and to retract the blade into the casing (only the inner end portion of the spring is visible, and the connection to the blade 12 and the casing hub elements are not shown). A center post 44 projects transversely from the casing half 10, and is diametrically split at 46 to receive and affix the end of the spring 42; it also defines an axial bore 48, in which the self-tapping screw 49 is engaged to secure the belt clip 51 and to help maintain the halves of the casing in assembly. The cylindrical pins 50, at three of the four "corners" of the casing, seat in corresponding counterbores formed into the opposite casing half, and cooperate therewith to provide apertures for the assembly screws 53.

Six short posts or stub axles 52 extend transversely at the points of transition of the blade 12 from the rearwardly extending leg of its travel path along the bottom wall element 14, to the upwardly extending leg along the rear wall element 16, then to a substantially rectilinear leg along the top wall element 18, and finally to a downwardly extending leg along the front wall element 20 and onto the spool 40. As will be noted, two such stub axles 52 are provided at each of the points of transition, and a small plastic roller 54 is rotatably mounted upon each of them (it will be appreciated that the other half of the casing has similarly positioned posts, which cooperatively provide the axles upon which the rollers 54 revolve). The pairs of rollers 54 cooperate to guide the blade around the generally right-angular corner turns; consequently, in passing over each roller the lead-on and pay-off segments of the blade will have approximately a 135° included angle "c" therebetween.

It is important to appreciate that the rollers 54 guide the blade 12 along a curvilinear path which includes no segment having a nominal radius that is less than about the natural radius of curvature of the blade (and normally, those nominal radii will be somewhat greater than that value), and that each roller has a radius that is substantially smaller than that of the natural curvature. Because of the inherent tendency of the transversely curved metal blade to maintain a rectilinear condition, it will tend to arch outwardly or convexly from rectilinear lines of tangency with the supporting components, when constrained along a circular path. This condition is most pronounced in the section between the spool 40 and the roller 54', which is closest to it along the travel path. As can be seen, the intervening segment of the blade follows a locus of points which deviates outwardly from the rectilinear line of tangency therebetween, designated by the letter Z in FIG. 2.

A shock-absorbing post or rib element 56 is formed on the casing half 10, and projects transversely therefrom in the region between the spool 40 and the roller 54' (the other casing member has a comparable element thereon, so that the rib supports the edges of the blade). As can be seen, it has an arcuate or curvilinear surface portion 58, which is disposed in the area circumscribed by the locus of points followed by the blade and the imaginary line of tangency Z, and has a radius of curvature with the value "X"; this radius will desirably approximate the radius of natural curvature of the blade, and will in any event be significantly larger than that of the roller 54'.

The rib 56 functions to prevent kinking of the blade 12 in the following manner: When the blade 12 is retracted, the engagement member 60 on its outer end (a hook, in the illustrated embodiment) will eventually engage the casing and abruptly arrest movement; this might also be caused by application of the locking member 32. In any event, resulting inertial forces will tend to snap the blade inwardly as the spool continues to rotate, thereby tending to straighten all segments spanning the points of support. The predominant effect will be produced in the segment between the spool 40 and the adjacent roller 54', with progressively decreased amounts of energy being transmitted to the segments located outwardly toward the free end of the blade. Consequently, the tendency for kinking to occur will be most severe at the roller 54', and the rib 56 is therefore positioned for maximum effectiveness. As the unsupported segment of the blade between the spool 40 and the roller 54' snaps inwardly toward the line of tangency Z, it is thrust upon the surface portion 58 of the rib 56. This restricts the sharpness of the bend of the blade about the roller 54' to a value less than that necessary to initiate kinking under the force of the spring. In other words, curvature of the blade about the roller 54' is decreased sufficiently that the yield point of the metal is not reached.

Moreover, because the contact surface area 58 of the rib 56 has a relatively large radius X, the impact forces will be sufficiently distributed to avoid kinking there, as well. It is to be noted that the leading and trailing portions of the rib may have virtually any configuration or curvature, as long as they present no areas of contact to the blade sufficiently severe as to induce kinking, and thereby frustrate the purpose of the rib.

As is best illustrated by FIG. 3, the rib 56 effectively divides the angle that would otherwise exist between the lead-on and pay-off segments of the blade 12 over the roller 54' into two, less severe angles (the supplements of which, angles "a" and "b", are shown for convenience). Angle "a" will desirably have a value in the range 35° to 10° (the supplementary angle being of course the included angle between the lead-on and pay-off segments over the rib, and having a value of 145° to 170°); the value of angle "b" will normally be about 35° to 45°. Although not specifically designated, it might be noted that the corresponding angle, taken with respect to the next roller 54", will normally also be about 35° to 45°.

By way of specific example, measuring rules of the type illustrated typically use a three-quarter inch wide blade, which will have a radius of natural curvature of about five-eights inch, and guide rollers of about three-eights inch diameter. A rib with a contact surface radius "X" of 0.4 inch, producing an angle "a" of about 17° to 18°, has been found to function very effectively therein.

Although the rollers 54 should present as little resistance to blade movement as possible, the contact surface 58 of the rib 56 may have a relatively high coefficient of friction, since it does not normally touch the blade. Indeed, it is important to ensure that the surface 58 will absorb a significant amount of the force of the inwardly impelled blade, to thereby minimize the transmission of energy to the roller 54' and the initiation of kinking thereon.

It might be pointed out that, although a roller having a large diameter could conceivably function in a manner similar to the rib 56, space limitations make it impractical to utilize such a component in the rule of the invention, while still maintaining desirable compactness and consumer appeal, as well as minimizing expense. Indeed, because the rule desirably includes the slide locking member 32, the available space is even more limited than it might otherwise be. It goes without saying that the rollers 54 are, of necessity, or relatively small radius for the same reasons; normally, they will all be identical.

Thus, it can be seen that the present invention provides a novel top reading power return rule wherein the possibility of blade kinking, upon abrupt arrestment of retraction, is substantially eliminated. Kinking is avoided without increasing the size of the casing or the amount of friction on the blade, and these features and advantages are achieved without significant increase in the cost or complexity of manufacture.

Having thus described the claims, what is claimed is:

1. A top reading power return rule, comprising:
   a. a casing having opposed sidewalls, a top wall, a bottom wall, a front wall and a rear wall defining an enclosure, said casing having a window in its top wall and a blade aperture adjacent the base of its front wall;
   b. a reel assembly including a spool mounted within said casing for rotation about a transverse axis between said sidewalls, and a power return spring operatively connected to said casing for rotation of said spool;
   c. a rule blade coiled on said spool for extension from and retraction into said casing, said blade having an outer end extending outwardly of said aperture and terminating in a member dimensioned and configured to engage said casing and thereby prevent full retraction of said blade thereinto, an inner end operatively connected to said return spring for winding on said spool, and an intermediate portion disposed along a path within said enclosure, said path consisting of a rearwardly extending leg along said bottom wall, an upwardly extending leg along said rear wall, a forwardly extending, substantially rectilinear leg along said top wall under said window, and a downwardly extending leg along said front wall to said spool, the construction of said blade causing it to tend toward a natural curvature of determinate radius when deflected longitudinally upon itself;
   d. a plurality of rollers disposed on said casing about said spool adjacent the transitions between said several legs of said path for supporting and guiding said intermediate portion of said blade therealong, at least the one of said rollers positioned to effect transition of said blade from said forwardly extending leg to said downwardly extending leg and lying closest to said spool along said path having a radius substantially smaller than said determinate radius, the natural curvature of said blade and the relative positions of said rollers and said spool causing said blade to assume a convexly arched configuration in normal movement between said one roller and said spool, outwardly from a rectilinear line of tangency extending therebetween; and
   e. a transversely extending shock-absorbing rib positioned on said casing between said one roller and said spool within the area circumscribed by said blade, in said convexly arched configuration, and said rectilinear line, said rib normally lying out of contact with said blade but being spaced from said line a distance sufficient to cause said blade, when tensioned toward said line, to contact said rib and thereby transfer a substantial proportion of the tensioning energy thereto, the surface of said rib facing said blade having a curved portion of substantial area with a radius significantly larger than that of said one roller, and being free of portions which would induce a substantially greater curvature in said tensioned blade, said rib serving to reduce the proportion of energy transferred to said one roller and to decrease the deflection of said blade when tensioned thereabout, thereby substantially precluding kinking of said blade about said one roller when retraction under the force of said spring is abruptly arrested, such as due to engagement of said member upon said casing.

2. The rule of claim 1 wherein said determinate radius of natural curvature of said blade is about 0.6 inch, said rib surface portion radius is about 0.4 inch, and said one roller has a radius of less than about 0.2 inch.

3. The rule of claim 1 wherein the position of said rib and the radius of curvature of said curved surface portion thereof causes said blade to deflect thereabout, when tensioned, with an included angle of about 145°–170° between the lead-on and pay-off segments.

4. The rule of claim 3 including a second and a third of said rollers each having a radius substantialy smaller than that of said rib curved surface portion, said third roller being positioned to effect transition of said blade from said upwardly extending leg to said forwardly extending leg, and said second roller being positioned between said first and third rollers and cooperating with said first roller to effect said transition from said forwardly extending leg to said downwardly extending leg, said first and second rollers being so positioned that said blade will have a lead-on and pay-off segment to and from each of said rollers disposed, when tensioned thereabout, with an included angle of about 135° to 145° therebetween.

5. The rule of claim 1 additionally including a member for locking said blade in positions extended from said casing, said casing having internal structure along said front wall for slidably seating said locking member.

* * * * *